US012574058B2

(12) United States Patent
Yang et al.

(10) Patent No.: US 12,574,058 B2
(45) Date of Patent: Mar. 10, 2026

(54) MULTIPLEXER AND ELECTRONIC DEVICE CONTAINING MULTIPLEXER

(71) Applicant: SAMSUNG ELECTRONICS CO., LTD., Suwon-si (KR)

(72) Inventors: Dongil Yang, Suwon-si (KR); John Moon, Suwon-si (KR); Hyoseok Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 568 days.

(21) Appl. No.: 17/982,813

(22) Filed: Nov. 8, 2022

(65) Prior Publication Data

US 2023/0126162 A1 Apr. 27, 2023

Related U.S. Application Data

(63) Continuation of application No. PCT/KR2022/014434, filed on Sep. 27, 2022.

(30) Foreign Application Priority Data

Oct. 27, 2021 (KR) ........................ 10-2021-0144195
Dec. 3, 2021 (KR) ........................ 10-2021-0172441

(51) Int. Cl.
*H04B 1/04* (2006.01)
*H04J 1/02* (2006.01)

(52) U.S. Cl.
CPC .................. *H04B 1/04* (2013.01); *H04J 1/02* (2013.01); *H04B 2001/0416* (2013.01)

(58) Field of Classification Search
None
See application file for complete search history.

(56) References Cited

U.S. PATENT DOCUMENTS 4,725,771 A * 2/1988 Sauerland .............. G01R 27/28
324/76.51
6,724,278 B1 4/2004 Smith
(Continued)

FOREIGN PATENT DOCUMENTS

KR 10-2001-0089603 10/2001
KR 10-1867792 6/2018
(Continued)

OTHER PUBLICATIONS

Search Report dated Dec. 14, 2022 in International Patent Application No. PCT/KR2022/014434.
(Continued)

*Primary Examiner* — Andre Tacdiran
(74) *Attorney, Agent, or Firm* — Nixon & Vanderhye, P.C.

(57) ABSTRACT

An example multiplexer may include a first port connected to a power amplifier, a second port connected an antenna, a third port connected to a low noise amplifier, a first filter configured to allow a first transmission signal corresponding to a first frequency band and obtained through the first port to pass therethrough so as to be output to the second port, a second filter configured to allow a second transmission signal corresponding to a second frequency band different from the first frequency band and obtained through the first port to pass therethrough so as to be output to the second port, and a third filter configured to allow a first reception signal corresponding to a third frequency band and a second reception signal corresponding to a fourth frequency band, which are obtained through the second port, to pass therethrough so as to be output to the third port.

18 Claims, 9 Drawing Sheets

(56) References Cited

U.S. PATENT DOCUMENTS

| | | | |
|---|---|---|---|
| 2008/0240000 A1* | 10/2008 | Kidd | H04B 1/0057 |
| | | | 370/275 |
| 2012/0243449 A1 | 9/2012 | He | |
| 2016/0049921 A1 | 2/2016 | Khlat | |
| 2018/0063031 A1* | 3/2018 | Wloczysiak | H04B 1/0057 |
| 2018/0109243 A1* | 4/2018 | Takamine | H03H 9/72 |
| 2018/0254766 A1* | 9/2018 | Shimozono | H03H 9/605 |
| 2018/0367168 A1* | 12/2018 | Lee | H04B 1/0057 |
| 2019/0081613 A1 | 3/2019 | Nosaka | |
| 2019/0190564 A1* | 6/2019 | Cook | H04B 1/0064 |
| 2020/0052677 A1 | 2/2020 | Oshita | |
| 2020/0067491 A1 | 2/2020 | Ota et al. | |
| 2020/0195295 A1 | 6/2020 | Kondo et al. | |
| 2020/0366320 A1 | 11/2020 | An et al. | |
| 2020/0382149 A1 | 12/2020 | Nagamori et al. | |
| 2020/0389228 A1* | 12/2020 | Ashworth | H04B 7/15535 |
| 2021/0058220 A1 | 2/2021 | Yang et al. | |
| 2021/0083702 A1 | 3/2021 | Jian et al. | |
| 2021/0242853 A1 | 8/2021 | Mori | |

FOREIGN PATENT DOCUMENTS

| | | |
|---|---|---|
| KR | 10-2018-0134417 | 12/2018 |
| KR | 10-2018-0137765 | 12/2018 |
| KR | 10-2019-0120861 A | 10/2019 |
| KR | 10-2020-0132017 | 11/2020 |
| WO | 2019/203518 | 10/2019 |

OTHER PUBLICATIONS

Written Opinion dated Dec. 14, 2022 in International Patent Application No. PCT/KR2022/014434.
Office Action dated Jan. 21, 2026 in Korean Application No. 10-2021-0172441 and English-language translation.

* cited by examiner (300)

FIG. 4

| FILTER | TRANSMISSION FREQUENCY BAND | RECEPTION FREQUENCY BAND |
|---|---|---|
| FIRST DUPLEXER | 832MHz ~ 862MHz | 791MHz ~ 821MHz |
| (2-1)TH DUPLEXER | 703MHz ~ 733MHz | 758MHz ~ 788MHz |
| (2-2)TH DUPLEXER | 718MHz ~ 748MHz | 773MHz ~ 803MHz |

401 FIRST DUPLEXER
403 (2-1)TH DUPLEXER
405 (2-2)TH DUPLEXER

[410]

| FILTER | TRANSMISSION FREQUENCY BAND | RECEPTION FREQUENCY BAND |
|---|---|---|
| FIRST FILTER | 832MHz ~ 862MHz | |
| SECOND FILTER | 703MHz ~ 748MHz | |
| THIRD FILTER | | 758MHz ~ 821MHz |

310 FIRST FILTER
330 SECOND FILTER
350 THIRD FILTER

[430]

(500)

Tx Envelop Waveform#1

Tx Envelop Waveform#1

Tx Envelop Waveform#1

MULTIPLEXER AND ELECTRONIC DEVICE CONTAINING MULTIPLEXER

CROSS-REFERENCE TO RELATED APPLICATIONS

This application is a continuation of International Application No. PCT/KR2022/014434 designating the United States, filed on Sep. 27, 2022, in the Korean Intellectual Property Receiving Office and claiming priority to Korean Patent Application No. 10-2021-0144195, filed on Oct. 27, 2021, in the Korean Intellectual Property Office, and to Korean Patent Application No. 10-2021-0172441, filed Dec. 3, 2021, the disclosures of all which are incorporated by reference herein in their entireties.

BACKGROUND

Field

The disclosure relates to a multiplexer and an electronic device including a multiplexer.

Description of Related Art

Transmission signals (for example, Tx signals) transmitted to the outside through an antenna of an electronic device may be generated by a communication processor and delivered to a radio frequency integrated circuit (RFIC). The RFIC may up-convert a baseband signal received from the communication processor to a radio frequency signal and may deliver the same to a radio frequency front end (RFFE) (for example, Tx module). The radio frequency signal delivered to the RFFE may be amplified by an amplifier (for example, power amplifier (PA)) included in the RFFE and may be output to the outside through the antenna as a Tx signal. Reception signals (for example, Rx signals) received from the outside through the antenna of the electronic device may be amplified by a low noise amplifier (LNA) included in the RFFE and may be delivered to the RFIC. The RFIC may down-convert the Rx signals to baseband signals, in contrast to Tx signals, and may deliver the same to the communication processor.

Uplink Carrier Aggregation (ULCA) may be generally used to improve the uplink data rate in 4G networks, among wireless communication systems. 5G networks may use E-UTRA/NR Dual Connectivity (ENDC) technology to support communication in data rates higher than ULCA. ENDC may generate tens of times of 2 Tx scenarios, compared with existing technologies, because it needs to re-farm and support not only an ultra high band (UHB) (for example, 3.3 GHz-5 GHz) but also a low band (LB) (for example, 600 MHz-1 GHz) which is a legacy band, a mid band (MB) (for example, 1.5 GHz-2.2 GHz), or a high band (HB) (for example, 2.3 GHz-2.7 GHz).

SUMMARY

Various embodiments may provide a multiplexer and an electronic device including the multiplexer, wherein the multiplexer has a filter structure for processing signals such that frequency bands of two reception signals partially overlap while frequency bands of two transmission signals do not overlap.

A multiplexer according to various embodiments of the disclosure may include a first port connected to a power amplifier, a second port connected to an antenna, a third port connected to a low noise amplifier, a first filter configured to allow a first transmission signal corresponding to a first frequency band and obtained through the first port to pass therethrough so as to be output to the second port, a second filter configured to allow a second transmission signal obtained through the first port and corresponding to a second frequency band different from the first frequency band to pass therethrough so as to be output to the second port, and a third filter configured to allow a first reception signal corresponding to a third frequency band or a second reception signal corresponding to a fourth frequency band, which are obtained through the second port, to pass therethrough so as to be output to the third port.

A communication circuit which includes a transmission circuit configured to amplify a radio frequency signal to be transmitted through an antenna of an electronic device and a reception circuit configured to amplify a radio frequency signal received from the antenna according to various embodiments of the disclosure may include a power amplifier configured to amplify a radio frequency signal to be transmitted to the antenna, a multiplexer connected to the power amplifier to output a radio frequency signal output from the power amplifier to the antenna, and connected to the antenna to output a radio frequency signal received from the antenna to a low noise amplifier, and the low noise amplifier connected to the multiplexer to amplify a radio frequency signal output from the multiplexer, wherein the multiplexer includes a first filter configured to allow a first transmission signal corresponding to a first frequency band to pass therethrough so as to be output to the antenna, a second filter configured to allow a second transmission signal corresponding to a second frequency band different from the first frequency band to pass therethrough so as to be output to the antenna, and a third filter configured to allow a first reception signal corresponding to a third frequency band or a second reception signal corresponding to a fourth frequency band, which are received from the antenna, to pass therethrough so as to be output to the low noise amplifier.

An electronic device according to various embodiments of the disclosure may include an antenna, a communication circuit, and a processor operatively connected to the antenna or the communication circuit, wherein the communication circuit includes a multiplexer including a first filter connected to a power amplifier and configured to allow a first transmission signal output from the power amplifier and corresponding to a first frequency band to pass therethrough so as to be output to the antenna, a second filter connected to the power amplifier and configured to allow a second transmission signal output from the power amplifier and corresponding to a second frequency band to pass therethrough so as to be output to the antenna, and a third filter configured to allow a reception signal received through the antenna to pass therethrough.

According to various embodiments, a multiplexer may be configured to have a filter structure that considers an ENDC situation such that two transmission signals can be simultaneously transmitted through a single multiplexer.

According to various embodiments, an ENDC situation can be processed through a single multiplexer such that mounting characteristics of an electronic device is improved.

According to various embodiments, a multiplexer may be configured such that frequency bands of two transmission signals and frequency bands of two reception signals do not overlap each other, thereby securing filter characteristics.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4 is a table illustrating a frequency band of an example filter included in a multiplexer according to various embodiments;

DETAILED DESCRIPTION

Figure 1:
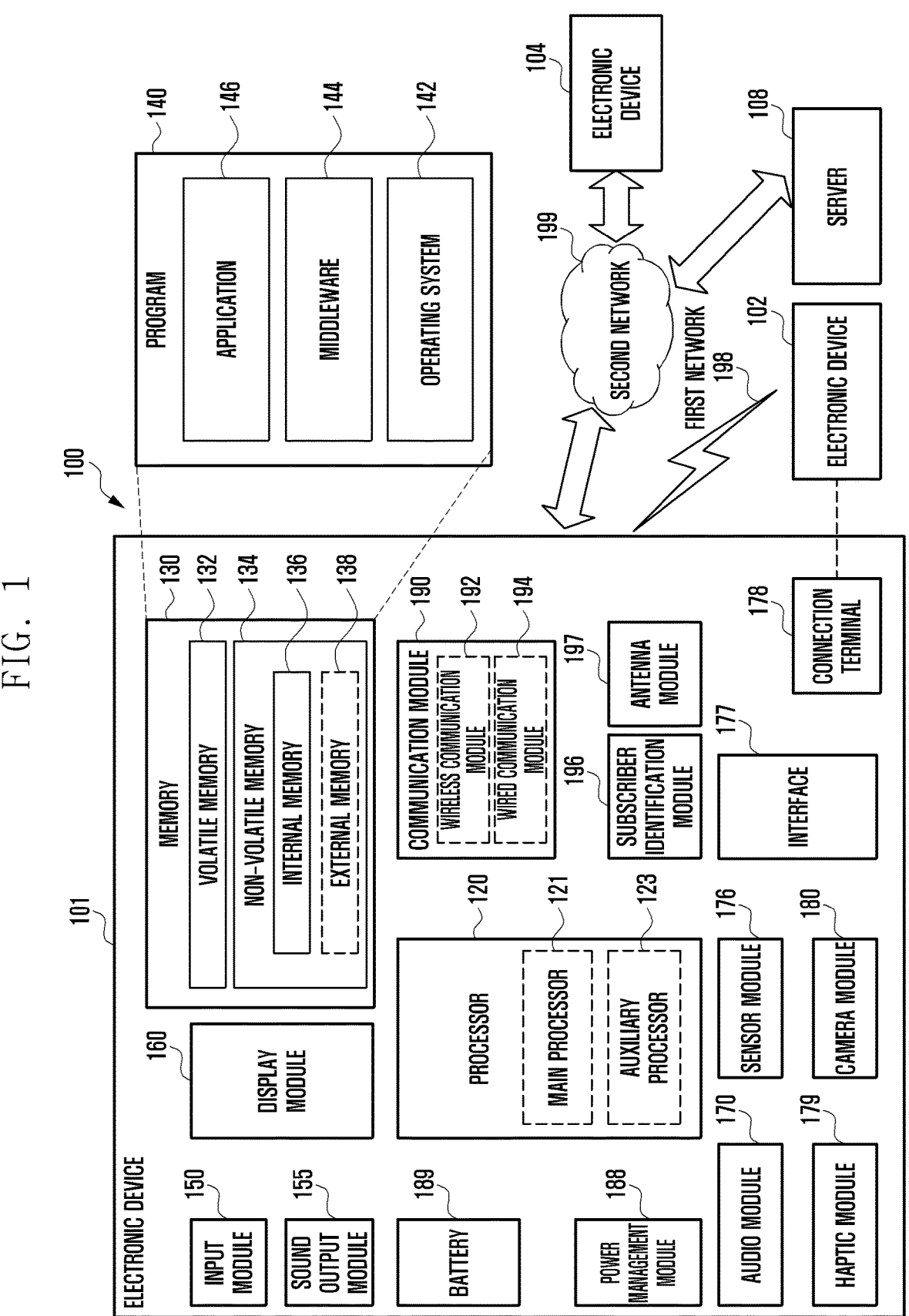
FIG. 1 is a block diagram illustrating an example electronic device in a network environment according to various embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium refers to, for example, a tangible device, and may not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
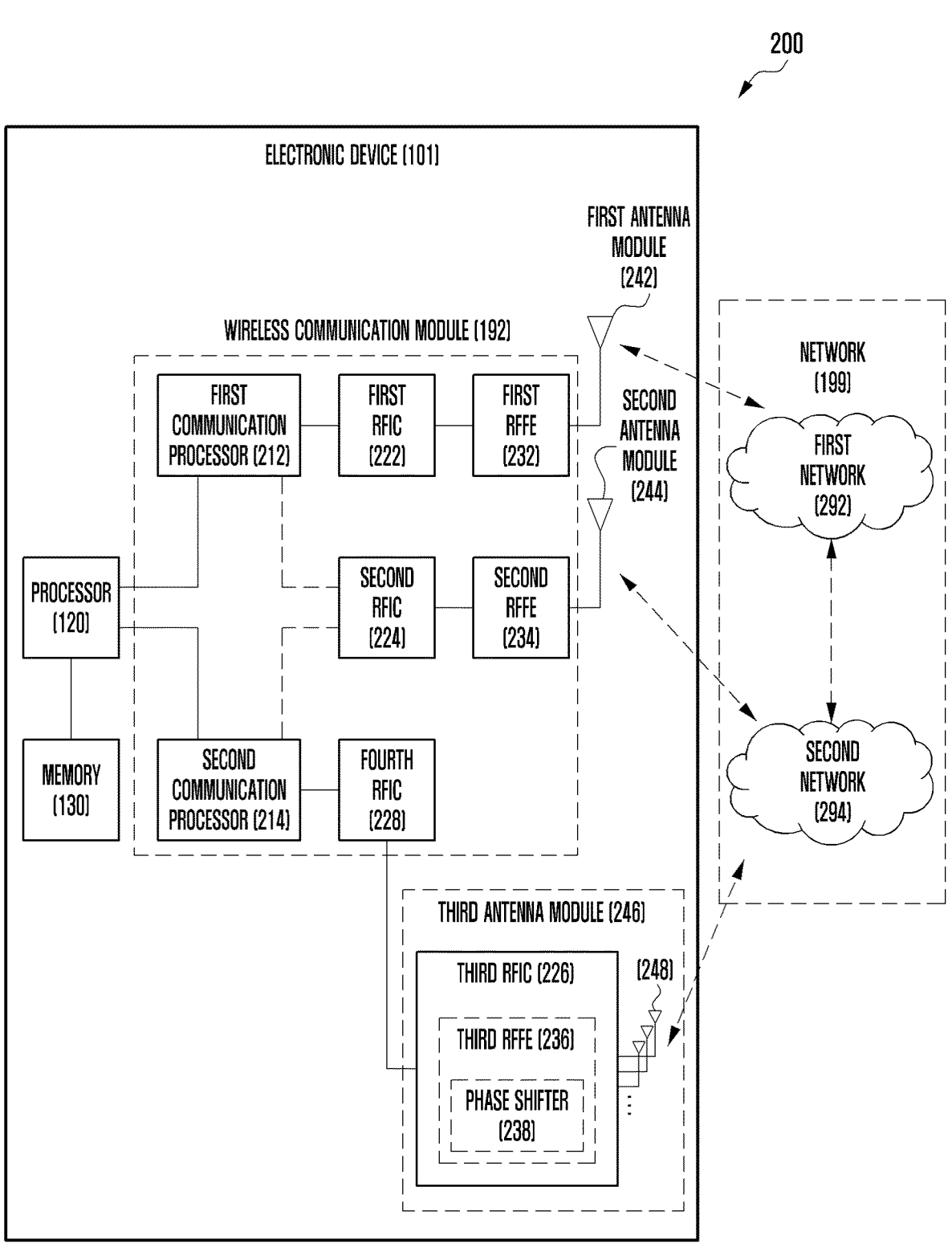
FIG. 2 is a block diagram illustrating an example electronic device configured to support legacy network communication and 5G network communication according to various embodiments.

FIG. 2 is a block diagram 200 illustrating an example electronic device configured to support legacy network communication and 5G network communication according to various embodiments.

Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module (e.g., including at least one antenna) 242, a second antenna module (e.g., including at least one antenna) 244, and an antenna 248. The electronic device 101 may further include a processor (e.g., including processing circuitry) 120 and a memory 130.

The network 199 may include a first network (e.g., a legacy network) 292 and a second network (e.g., a 5G network) 294. According to an embodiment, the electronic device 101 may further include at least one component among the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to an embodiment, the fourth RFIC 228 may be omitted or included as a part of the third RFIC 226.

The first communication processor 212 may include various communication processing circuitry and support establishment of a communication channel in a band to be used for wireless communication with the first network 292, and legacy network communication through the established communication channel According to various embodiments, the first network may be a legacy network including, for example, and without limitation, a 2G, 3G, 4G, or long term evolution (LTE) network. The second communication processor 214 may support establishment of a communication channel corresponding to a designated band (for example, about 6 GHz to about 60 GHz) among bands to be used for wireless communication with the second network 294, and, for example, and without limitation, 5G network communication through the established communication channel. According to various embodiments, the second network 294 may, for example, be a 5G network as referenced by third generation partnership project (3GPP).

Additionally, according to an embodiment, the first communication processor 212 or the second communication processor 214 may support establishment of a communication channel corresponding to another designated band (for example, about 6 GHz or lower) among the bands to be used for wireless communication with the second network 294, and, for example, 5G network communication through the established communication channel. According to an embodiment, the first communication processor 212 and the second communication processor 214 may be implemented inside a single chip or a single package. According to various embodiments, the first communication processor 212 or the second communication processor 214 may, for example, be provided inside a single chip or a single package together with a processor 120, an auxiliary processor 123, or a communication module 190.

The first RFIC 222 may convert a baseband signal generated by the first communication processor 212 into a radio frequency (RF) signal at about 700 MHz to about 3 GHz, which may be used for the first network 292 (for example, legacy network), during transmission. During reception, an RF signal may be acquired from the first network 292 (for example, legacy network) through an antenna (for example, the first antenna module 242), and may be preprocessed through an RFFE (for example, the first RFFE 232). The first RFIC 222 may convert the preprocessed RF signal into a baseband signal such that the same can be processed by the first communication processor 212.

The second RFIC 224 may convert a baseband signal generated by the first communication processor 212 or the second communication processor 214 into an RF signal in a Sub6 band (for example, about 6 GHz or lower) (hereinafter, referred to as a 5G Sub6 RF signal) that may be used for the second network 294 (for example, 5G network). During reception, a 5G Sub6 RF signal may be acquired from the second network 294 (for example, 5G network) through an antenna (for example, the second antenna module 244), and may be preprocessed through an RFFE (for example, the second RFFE 234). The second RFIC 224 may convert the preprocessed 5G Sub6 RF signal into a baseband signal such that the same can be processed by a communication processor corresponding to the first communication processor 212 or the second communication processor 214.

The third RFIC 226 may convert a baseband signal generated by the second communication processor 214 into an RF signal in a 5G Above6 band (for example, about 6

GHz to about 60 GHz) (hereinafter, referred to as a 5G Above6 signal) that is to be used for the second network 294 (for example, 5G network). During reception, a 5G Above6 RF signal may be acquired from the second network 294 (for example, 5G network) through an antenna (for example, the antenna 248), and may be preprocessed through the third RFFE 236. The third RFIC 226 may convert the preprocessed 5G Above6 signal into a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from the third RFIC 226 or as at least a part thereof. In this example, the fourth RFIC 228 may convert a baseband signal generated by the second communication processor 214 into an RF signal in an intermediate frequency band (for example, about 9 GHz to about 11 GHz) (hereinafter, referred to as an IF signal) and then deliver the IF signal to the third RFIC 226. The third RFIC 226 may convert the IF signal into a 5G Above6 RF signal. During reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal such that the same can be processed by the second communication processor 214.

According to an embodiment, the first RFIC 222 and the second RFIC 224 may, for example, be implemented as at least a part of a single chip or a single package. According to an embodiment, the first RFFE 232 and the second RFFE 234 may, for example, be implemented as at least a part of a single chip or a single package. According to an embodiment, at least one antenna module of the first antenna module 242 or the second antenna module 244 may be omitted or coupled to another antenna module so as to process RF signal in multiple corresponding bands.

According to an embodiment, the third RFIC 226 and the antenna 248 may be arranged on the same substrate so as to form a third antenna module 246. For example, the wireless communication module 192 or the processor 120 may be arranged on a first substrate (for example, main PCB). In this example, the third RFIC 226 may be formed on a partial area (for example, lower surface) of a second substrate (for example, sub PCB) that is separate from the first substrate, and the antenna 248 may be arranged in another partial area (for example, upper surface), thereby forming a third antenna module 246. The third RFIC 226 and the antenna 248 may be arranged on the same substrate such that the length of the transmission line between the same can be reduced. This may reduce loss (for example, attenuation) of a signal in a high-frequency band (for example, about 6 GHz to about 60 GHz) used for 5G network communication, for example, due to the transmission line. Accordingly, the electronic device 101 may improve the quality or speed of communication with the second network 294 (for example, 5G network).

According to an embodiment, the antenna 248 may, for example, include an antenna array including multiple antenna elements that may be used for beamforming. In this example, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (for example, base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 (for example, 5G network) may be operated independently of the first network 292 (for example, legacy network) (for example, standalone (SA)), or operated while being connected thereto (for example, non-standalone (NSA)). For example, the 5G network may include an access network (for example, 5G radio access network (RAN) or next-generation network (NG RAN)) and may not include a core network (for example, next-generation core (NGC)). In this example, the electronic device 101 may access the access network of the 5G network and then access an external network (for example, Internet) under the control of the core network (for example, evolved packed core (EPC)) of the legacy network. Protocol information (for example, LTE protocol network) for communication with the legacy network or protocol information (for example, new radio (NR) protocol information) for communication with the 5G network may be stored in the memory 130, and may be accessed by another component (for example, the processor 120, the first communication processor 212, or the second communication processor 214).

Figure 3:
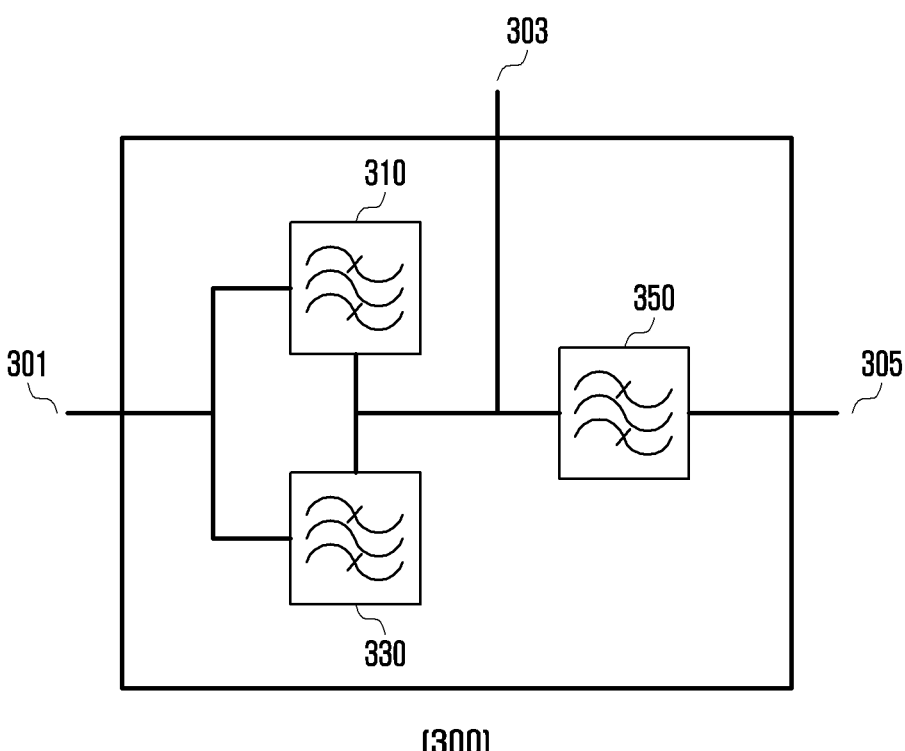
FIG. 3 illustrates an example multiplexer according to various embodiments.

FIG. 3 illustrates an example multiplexer according to various embodiments.

Referring to FIG. 3, the multiplexer 300 may include at least one of a first port 301, a second port 303, a third port 305, a first filter 310, a second filter 330, or a third filter 350. For example and without limitation, the first port 301 may be an input port, a second port 303 may be an input/output port, and the third port 305 may be an output port.

The first port 301 may be connected to a communication circuit (e.g., the first RFFE 232 in FIG. 2) included in an electronic device (e.g., the electronic device (e.g., the electronic device 101 in FIG. 1) in FIG. 1) according to various embodiments. The first port 301 may be an input port configured to receive a radio frequency signal output from the power amplifier. The radio frequency signal may refer, for example, to a transmission signal amplified by the power amplifier. A transmission signal input through the first port 301 may be input to the first filter 310 or the second filter 330.

The second port 303 may be connected to an antenna (e.g., the antenna module 197 in FIG. 1 and the first antenna 242 in FIG. 2) of the electronic device 101. The second port 303 may output a reception signal output from the first filter 310 or the second filter 330 to the antenna module 197. In addition, the second port 303 may receive a reception signal from the antenna module 197. The reception signal may be input to the third filter 350.

The third port 305 may be connected to an amplifier (e.g., a low noise amplifier) included in the communication circuit. The third port 305 may output a reception signal output from the third filter 350 to the low noise amplifier. The reception signal may be amplified through the low noise amplifier and input to an RFIC (e.g., the first RFIC 222 in FIG. 2) of the electronic device 101.

The first filter 310 may be a band pass filter configured to allow a first transmission signal corresponding a first frequency band to pass therethrough. The first filter 310 may allow the first transmission signal corresponding to the first frequency band among transmission signals input through the first port 301 to pass therethrough. The first transmission signal having passed through the first filter 310 may be transferred to the antenna module 197 through the second port 303.

The second filter 330 may be a band pass filter configured to allow a second transmission signal corresponding a second frequency band to pass therethrough. The second frequency band is different from the first frequency band, and the first frequency band and the second frequency band may not overlap each other. The second filter 330 may allow the second transmission signal corresponding to the second frequency band among transmission signals input through the first port 301 to pass therethrough. The second transmission signal having passed through the second filter 330 may be transferred to the antenna module 197 through the second port 303.

According to various embodiments, preventing the first frequency band and the second frequency band from overlapping each other may be in consideration of an E-UTRA/NR dual connectivity (ENDC) situation, which is configured to simultaneously transmit two transmission signals. In ENDC, transmission signals may be simultaneously transferred through a first network (e.g., the first network 292 in FIG. 2) or a second network (e.g., the second network 294 in FIG. 2). The first network 292 or the second network 294 may include a low band (LB, e.g., 600 MHz-1 GHz), a mid-band (MB, e.g., 1.5 GHz-2.2 GHz), a high band (HB, e.g., 2.3 GHz-2.7 GHz), or an ultra-high band (UHB, e.g., 3.3 GHz-5 GHz). The frequency band corresponding to the first network 292 or the second network 294 is an example for better understanding and the disclosure is not limited by this example.

For example, when the first transmission signal and the second transmission signal are simultaneously transmitted, the first transmission signal and the second transmission signal may be input to the multiplexer 300 through one communication path, that is, the first port 301. Since frequency bands of the two transmission signals are different, even when input through the first port 301 which is one communication path, the first transmission signal may pass through the first filter 310 to be transferred to the antenna module 197 and the second transmission signal may pass through the second filter 330 to be transferred to the antenna module 197. Even when the first transmission signal and the second transmission signal are input through one communication path, it may be processed so that interference between the transmission signals is small by transferring the signals to the antenna module 197 through each corresponding filter.

The third filter 350 may be a band pass filter configured to allow a first reception signal corresponding to a third frequency band or a second reception signal corresponding to a fourth frequency band to pass therethrough. The third frequency band is different from the fourth frequency band, and partial bands of the third frequency band and the fourth frequency band may overlap each other. The third filter 350 may allow a reception signal of a frequency band including the fourth frequency band to pass therethrough in the third frequency band.

FIG. 4 is a table illustrating a frequency band of an example filter included in a multiplexer according to various embodiments.

Referring to FIG. 4, a first table 410 may illustrate a frequency band of a duplexer. For example, a first duplexer 401 may allow a first transmission signal corresponding to a first transmission frequency to pass therethrough and allow a first reception signal corresponding to a first reception frequency to pass therethrough. The first transmission frequency may include 832 MHz-862 MHz, and the first reception frequency may include 791 MHz-821 MHz. A (2–1)th (a $1^{st}$ second) duplexer 403 may allow a second transmission signal corresponding to a second transmission frequency to pass therethrough and allow a second reception signal corresponding to a second reception frequency to pass therethrough. The second transmission frequency may include 703 MHz-733 MHz, and the second reception frequency may include 758 MHz-788 MHz. A (2–2)th (a $2^{nd}$ second) duplexer 405 may allow a third transmission signal corresponding to a third transmission frequency to pass therethrough and allow a third reception signal corresponding to a third reception frequency to pass therethrough. The third transmission frequency may include 718 MHz-748 MHz, and the third reception frequency may include 773 MHz-803 MHz.

An electronic device (e.g., the electronic device 101 in FIG. 1) according to various embodiments includes many electronic components (or constituents) (e.g., the processor 120, the memory 130, and the like in FIG. 1) in a limited size (or space), and thus a size of electronic components may be limited. In order to include required electronic parts in a limited size, it may be efficient that the electronic device 101 includes a small number or a small size of electronic components. The first duplexer 401 may overlap the (2–2)th duplexer 405 in terms of a reception frequency band (e.g., a first frequency band (791 MHz-821 MHz) and a third frequency band (773 MHz-803 MHz) of a reception signal.

In consideration of an ENDC situation required to simultaneously perform reception/transmission of two bands, when the (2–1)th duplexer 403 and the (2–2)th duplexer 405 are configured to be one duplexer, frequencies of the first reception signal and the third reception signal may overlap so as not to be used together. Therefore, in consideration of the ENDC situation in a general configuration, a duplexer having a frequency distributed as the first table 410 may be used to support the ENDC.

When each of the (2–1)th duplexer 403 and the (2–2)th duplexer 405 is included in the electronic device 101, the number of electronic components included in the electronic device 101 may increase. When the number of the electronic components increase, the electronic device 101 may have a size issue.

In the embodiment, the (2–1)th duplexer 403 and the (2–2)th duplexer 405 may be implemented as a multiplexer (e.g., the multiplexer 300 in FIG. 3) implemented in one integrated circuit together with the first duplexer 401.

A second table 430 may illustrate a frequency band of a filter included in the multiplexer 300. The multiplexer 300 may include a first filter (the first filter 310 in FIG. 3), a second filter (e.g., the second filter 330 in FIG. 3), or a third filter (e.g., the third filter 350 in FIG. 3). The first filter 310 may be a band pass filter configured to allow a first transmission signal corresponding a first frequency band (or transmission frequency band) (e.g., 832 MHz-862 MHz) to pass therethrough. The second filter 330 may be a band pass filter configured to allow a second transmission signal corresponding a second frequency band (e.g., 703 MHz-748 MHz) to pass therethrough. Since the first frequency band and the second frequency band do not overlap each other, the multiplexer 300 may support an ENDC configured to simultaneously transmit two transmission signals.

The third filter 350 may be a band pass filter configured to allow a first reception signal corresponding to a third frequency band (or reception frequency band) (e.g., 758 MHz-803 MHz) or a second reception signal corresponding to a fourth frequency band (e.g., 791 MHz-821 MHz) to pass therethrough. Examples for the first frequency band to the fourth frequency band are provided only to help the understanding of the disclosure, and are not intended to limit the disclosure. The transmission frequency of the (2–1)th duplexer 403 and the (2–2)th duplexer 405 are included in the second frequency band of the second filter 330. The reception frequency of the (2–1)th duplexer and the (2–2) duplexer are included in the third frequency band of third filter 350.

When the multiplexer 300 instead of the first duplexer 401, the (2–1)th duplexer 403, and the (2–2)th duplexer 405 is included in the electronic device 101, the number of electronic components included in the electronic device 101 may be reduced. The reduction of the number of the electronic components may improve the size constraint of the electronic device 101.

A multiplexer (e.g., the multiplexer 300 in FIG. 3) according to various embodiments of the disclosure may include a first port (e.g., the first port 301 in FIG. 3) connected to a power amplifier, a second port (e.g., the second port 303 in FIG. 3) connected an antenna (e.g., the antenna module 197 in FIG. 1), a third port (e.g., the third port 305 in FIG. 3) connected to a low noise amplifier, a first filter (e.g., the first filter 310 in FIG. 3) configured to allow a first transmission signal corresponding to a first frequency band obtained through the first port to pass therethrough so as to be output to the second port, a second filter (e.g., the second filter 330 in FIG. 3) configured to allow a second transmission signal corresponding to a second frequency band different from the first frequency band obtained through the first port to pass therethrough so as to be output to the second port, and a third filter (e.g., the third filter 350 in FIG. 3) configured to allow a first reception signal corresponding to a third frequency band or a second reception signal corresponding to a fourth frequency band, which are obtained through the second port, to pass therethrough so as to be output to the third port.

The first filter, the second filter, and the third filter may be implemented as a band pass filters.

When the first transmission signal and the second transmission signal are simultaneously obtained through the first port, the first filter may be configured to allow the first transmission signal to pass therethrough for output to the second port and the second filter may be configured to allow the second transmission signal to pass therethrough for output to the second port.

The second port may be configured to transfer the first transmission signal or the second transmission signal to the antenna, or transfer the first reception signal or the second reception signal received from the antenna to the third filter.

The first frequency band and the second frequency band may be configured not to overlap each other.

The third frequency band and the fourth frequency band may be configured to have partial frequency bands overlapping each other.

Figure 5:
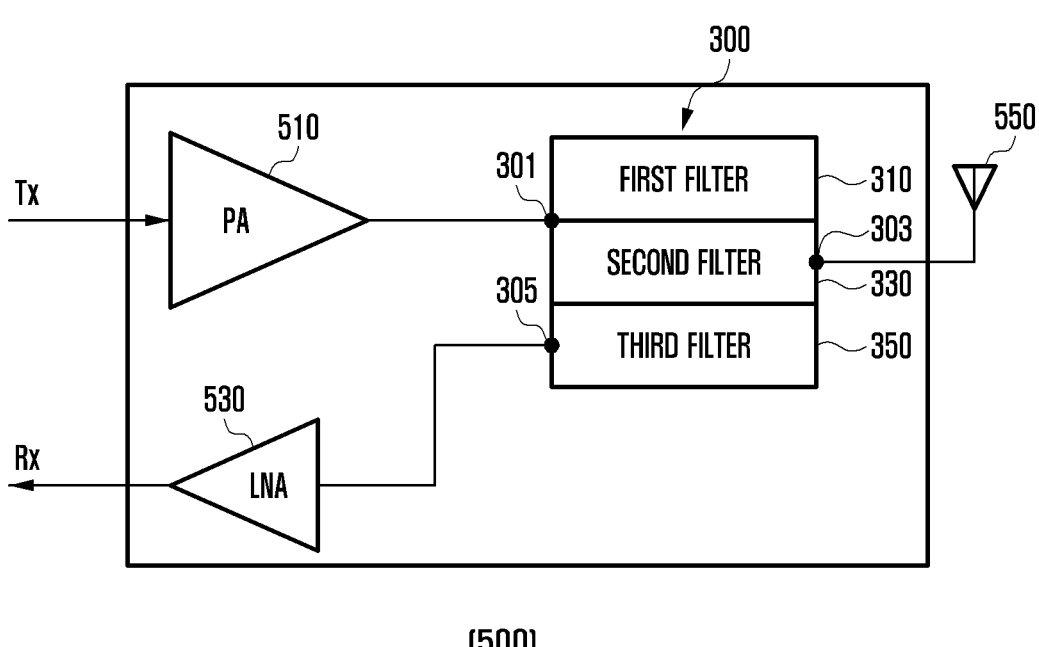
FIG. 5 illustrates an example communication circuit according to various embodiments.

FIG. 5 illustrates an example communication circuit according to various embodiments.

Referring to FIG. 5, the communication circuit 500 may include a power amplifier 510, a multiplexer (e.g., the multiplexer 300 in FIG. 3), and a low noise amplifier 530. The communication circuit 500 may correspond to the first RFFE 232 in FIG. 2 and may include other components (e.g., a mobile industry processor interface (MIPI) antenna switch (ASW)) in addition to the described components. The communication circuit 500 may include a transmission circuit (e.g., a Tx module) or a reception circuit (e.g., an Rx module). The transmission circuit may amplify a transmission signal received from an RFIC to be transferred to the antenna module 550 (e.g., the antenna module 197 in FIG. 1). The reception circuit may amplify a reception signal received from the antenna module 550 to be transferred to an RFIC.

The power amplifier 510 may amplify a radio frequency signal to be transmitted through the antenna module 550 (e.g., the antenna module 197 in FIG. 1). The radio frequency signal may be input from an RFIC (e.g., the first RFIC 222 in FIG. 2). The radio frequency signal is a signal to be transmitted through the antenna module 550 and thus may be referred to, for example, as a transmission signal (Tx). The transmission signal (Tx) amplified through the power amplifier 510 may be input to the multiplexer 300.

The multiplexer 300 may transfer a transmission signal input from the power amplifier 510 to the antenna module 550, or transfer a reception signal obtained from the antenna module 550 to the low noise amplifier 530. The multiplexer 300 may include at least one of a first port (e.g., the first port 301 in FIG. 3), a second port (e.g., the second port 303 in FIG. 3), a third port (e.g., the third port 305 in FIG. 3), a first filter (e.g., the first filter 310 in FIG. 3), a second filter (e.g., the second filter 330 in FIG. 3), and a third filter (e.g., the third filter 350 in FIG. 3).

For example, during transmission, the multiplexer 300 may receive a first transmission signal or a second transmission signal from the power amplifier 510 through the first port 301. The first transmission signal may be a radio frequency signal corresponding to a first frequency band and the second transmission signal may be a radio frequency signal corresponding to a second frequency band. The first frequency band and the second frequency band may not overlap each other. When it is not an ENDC situation, during transmission, the multiplexer 300 may receive one of a first transmission signal or a second transmission signal from the power amplifier 510. When it is an ENDC situation, during transmission, the multiplexer 300 may receive a first transmission signal and a second transmission signal from the power amplifier 510.

The first filter 310 may be a band pass filter configured to allow a first transmission signal corresponding a first frequency band to pass therethrough. The first filter 310 may allow the first transmission signal corresponding to the first frequency band among transmission signals input through the first port 301 to pass therethrough. The first transmission signal having passed through the first filter 310 may be transferred to the antenna module 550 through the second port 303.

The second filter 330 may be a band pass filter configured to allow a second transmission signal corresponding a second frequency band to pass therethrough. The second frequency band is different from the first frequency band, and the first frequency band and the second frequency band may not overlap each other. The second filter 330 may allow the second transmission signal corresponding to the second frequency band among transmission signals input through the first port 301 to pass therethrough. The second transmission signal having passed through the second filter 330 may be transferred to the antenna module 550 through the second port 303.

During reception, the multiplexer 300 may receive a first reception signal or a second reception signal from the antenna module 550 through the second port 303. The first reception signal may be a radio frequency signal corresponding to a third frequency band and the second reception signal may be a radio frequency signal corresponding to a fourth frequency band. The third frequency band and the fourth frequency band may partially overlap each other.

The third filter 350 may be a band pass filter configured to allow a first reception signal corresponding to a third frequency band or a second reception signal corresponding to a fourth frequency band to pass therethrough. The third filter 350 may allow a reception signal of a frequency band including the fourth frequency band to pass therethrough in the third frequency band. The first reception signal or the second transmission signal having passed through the third filter 350 may be input to the low noise amplifier 530 through the third port 305.

The low noise amplifier (LNA) 530 may amplify the first reception signal or the second reception signal to be output to the first RFIC 222. The RFIC 222 may process a reception signal (Rx) output from the low noise amplifier 530 to be output to a processor (e.g., the processor 120 in FIG. 1 and the first communication processor 212 in FIG. 2). For example, the first RFIC 222 may convert the first reception signal or the second reception signal into a baseband signal. The reception signal having been converted into the baseband signal may be input to the first communication processor 212.

In an electronic device (e.g., the electronic device 101 in FIG. 1) according to various embodiments of the disclosure, a communication circuit (e.g., the communication circuit 500 in FIG. 5) including a transmission circuit configured to amplify a radio frequency signal to be transmitted through an antenna (e.g., the antenna module 197 in FIG. 1) and a reception circuit configured to amplify a radio frequency signal received from the antenna may include a power amplifier (e.g., the power amplifier 510 in FIG. 5) configured to amplify a radio frequency signal transmitted through the antenna, a multiplexer (e.g., the multiplexer 300 in FIG. 3) connected to the power amplifier to output a radio frequency signal output from the power amplifier to the antenna, and connected to the antenna to output a radio frequency signal received from the antenna to a low noise amplifier, and the low noise amplifier (e.g., the low noise amplifier 530 in FIG. 5) connected to the multiplexer to amplify a radio frequency signal output from the multiplexer, wherein the multiplexer may be configured to include a first filter (e.g., the first filter 310 in FIG. 3) configured to allow a first transmission signal corresponding to a first frequency band to pass therethrough so as to be output to the antenna, a second filter (e.g., the second filter 330 in FIG. 3) configured to allow a second transmission signal corresponding to a second frequency band different from the first frequency band to pass therethrough so as to be output to the antenna, and a third filter (e.g., the third filter 350 in FIG. 3) configured to allow a first reception signal corresponding to a third frequency band or a second reception signal corresponding to a fourth frequency band, which are received from the antenna, to pass therethrough so as to be output to the low noise amplifier.

Figure 6:
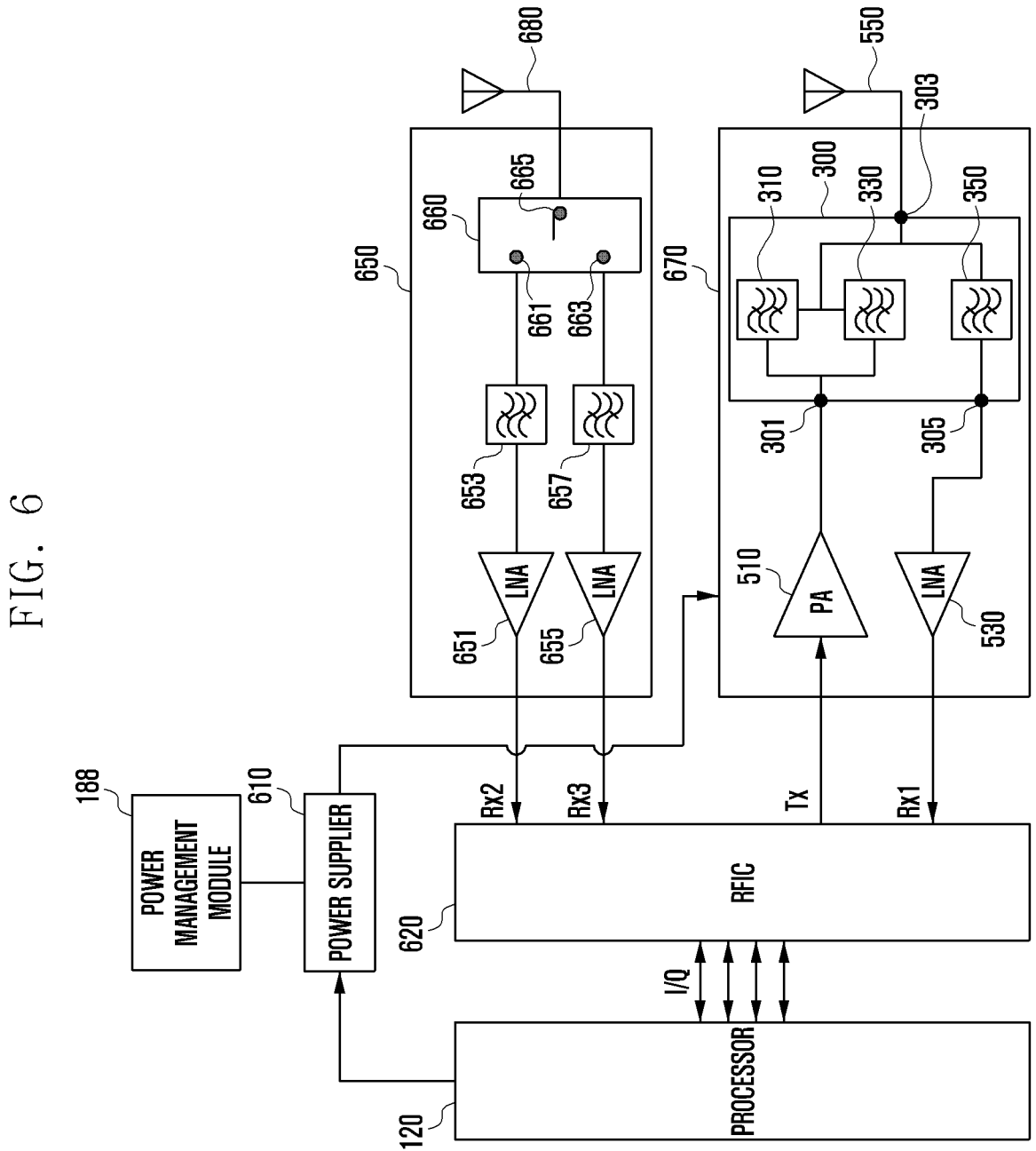
FIG. 6 illustrates communication of an example electronic device according to various embodiments.

FIG. 6 illustrates an example electronic device according to various embodiments.

Referring to FIG. 6, an electronic device (e.g., the electronic device 101 in FIG. 1) according to various embodiments may include at least one of a power management module (e.g., the power management module 188 in FIG. 1), a power supplier 610, a processor (e.g., the processor 120 in FIG. 1, and the first communication processor 212 in FIG. 2), an RFIC 620 (e.g., the first RFIC 222 in FIG. 2), a first communication circuit 670 (e.g., the communication circuit 500 in FIG. 5), a second communication circuit 650, a first antenna module 550 (e.g., the antenna module 550 in FIG. 5), or a second antenna module 680 (e.g., the antenna module 197 in FIG. 1). The first communication circuit 670 and the second communication circuit 650 may be formed (or implemented) in one integrated circuit or chip (e.g., a single chip).

The power management module 188 (e.g., including various power management circuitry) may manage power supplied to the electronic device 101. The power management module 188 may supply power to the power supplier 610. In an embodiment, the power supplier 610 (e.g., including various power supply circuitry) may receive power from the power management module 188 and receive an envelope signal from the processor 120 or the RFIC 620. The power supplier 610 may supply power corresponding to the envelope signal to the first communication circuit 670 using the supplied power. The power supplier 610 may be a component configured to supply a voltage applied to a power amplifier (e.g., the power amplifier 510 in FIG. 5). The power corresponding to the envelope signal may be supplied to the power amplifier 510 included in the first communication circuit 670.

According to an embodiment, the processor 120 may generate a baseband signal to be transferred to the RFIC 620, and the baseband signal may be converted into a radio frequency signal through the RFIC 620 to be input to the power amplifier 510. During an envelope tracking (ET) operation, based on an envelope of a radio frequency signal input from the RFIC 620 to the power amplifier 510, the processor 120 may transfer an envelope signal to the power supplier 610, and the power supplier 610 may supply power (or a voltage) to the power amplifier 510 based on the envelope signal.

Although, the drawing illustrates that the processor 120 provides an envelope signal to the power supplier 610, the envelope signal may be provided from the RFIC 620 to the power supplier 610. The envelope signal may be provided from one of the processor 120 or the RFIC 620. The drawing is for helping understanding of the disclosure, and does not limit the disclosure. In addition, although the processor 120 is illustrated in the drawing, the processor 120 may refer, for example, to a communication processor (e.g., the first communication processor 212 in FIG. 2) included in a communication module (e.g., the communication module 190 in FIG. 1).

During transmission, the RFIC 620 may convert a baseband signal generated by the processor 120 into a radio frequency signal (e.g., a transmission signal) corresponding to a designated frequency band. The converted radio frequency signal (e.g., a Tx signal) may be a signal to be transferred through the first antenna module 550 and may be input to the first communication circuit 670. For example, during transmission, the RFIC 620 may transfer the converted radio frequency signal (e.g., a Tx signal) to the first communication circuit 670. During reception, the RFIC 620 may obtain a radio frequency signal (e.g., a reception signal) received from the first antenna module 550 through the first communication circuit 670, and may convert the obtained radio frequency signal into a baseband signal. In addition, during reception, the RFIC 620 may obtain a radio frequency signal (e.g., a reception signal) received from the second antenna module 680 through the second communication circuit 650, and may convert the obtained radio frequency signal into a baseband signal. During reception, the RFIC 620 may transfer the converted baseband signal to the processor 120.

The first communication circuit 670 may include at least one of a power amplifier (e.g., the power amplifier 510 in FIG. 5), a multiplexer (e.g., the multiplexer 300 in FIG. 3), or a low noise amplifier (e.g., the low noise amplifier 530 in FIG. 5). The first communication circuit 670 may include a transmission circuit (e.g., a Tx module) and a reception circuit (e.g., a Rx module). The transmission circuit may amplify a transmission signal received from the RFIC 620 to be transferred to the first antenna module 550. The reception circuit may amplify a reception signal received from the first antenna module 550 to be transferred to the RFIC 620.

The power amplifier 510 may amplify a radio frequency signal to be transferred through the first antenna module 550. The radio frequency signal may be input from the RFIC 620. The radio frequency signal is a signal to be transmitted through the first antenna module 550 and thus may be referred to, for example, as a transmission signal (Tx). The transmission signal (Tx) amplified through the power amplifier 510 may be input to the multiplexer 300.

The multiplexer 300 may transfer a transmission signal input from the power amplifier 510 to the first antenna module 550, or transfer a reception signal obtained from the first antenna module 550 to the low noise amplifier 530. The multiplexer 300 may include at least one of a first port (e.g., the first port 301 in FIG. 3), a second port (e.g., the second port 303 in FIG. 3), a third port (e.g., the third port 305 in FIG. 3), a first filter (e.g., the first filter 310 in FIG. 3), a second filter (e.g., the second filter 330 in FIG. 3), or a third filter (e.g., the third filter 350 in FIG. 3). The multiplexer 300 has been described in detail with reference to FIG. 3 and FIG. 5 and thus will be briefly described below.

The first filter 310 may be a band pass filter configured to allow a first transmission signal corresponding a first frequency band to pass therethrough. The first filter 310 may allow the first transmission signal corresponding to the first frequency band among transmission signals input through the first port 301 to pass therethrough. The first transmission signal having passed through the first filter 310 may be transferred to the first antenna module 550 through the second port 303.

The second filter 330 may be a band pass filter configured to allow a second transmission signal corresponding a second frequency band to pass therethrough. The second frequency band is different from the first frequency band, and the first frequency band and the second frequency band may not overlap each other. The second filter 330 may allow the second transmission signal corresponding to the second frequency band among transmission signals input through the first port 301 to pass therethrough. The second transmission signal having passed through the second filter 330 may be transferred to the first antenna module 550 through the second port 303.

In an ENDC situation in which the first transmission signal and the second transmission signal are simultaneously output from the power amplifier 510, the multiplexer 300 may simultaneously receive the first transmission signal and the second transmission signal through the first port 301. The first transmission signal may be transferred to the first antenna module 550 through the first filter 310, and the second transmission signal may be transferred to the first antenna module 550 through the second filter 330. The first transmission signal and the second transmission signal may have frequency bands not overlapping each other, and may be transferred to the first antenna module 550 through the first filter 310 and the second filter 330, respectively.

A first reception signal or a second reception signal received through the first antenna module 550 may be input to the third filter 350. The third filter 350 may be a band pass filter configured to allow a first reception signal corresponding to a third frequency band or a second reception signal corresponding to a fourth frequency band to pass therethrough. The first reception signal or the second transmission signal having passed through the third filter 350 may be input to the low noise amplifier 530 through the third port 305. The low noise amplifier 530 may amplify the first reception signal or the second reception signal to be output to the RFIC 620.

The second communication circuit 650 may include at least one of a first low noise amplifier 651, a first band pass filter 653, a second low noise amplifier 655, a second band pass filter 657, or an antenna switch 660. The second communication circuit 650 may correspond to a reception circuit (e.g., a Rx module). The second communication circuit 650 may amplify a reception signal received through the second antenna module 680 to be transferred to the RFIC 620. The antenna switch 660 may include at least one of a first output port 661, a second output port 663, or an input port 665. The antenna switch 660 may connect the input port 665 to the first output port 661 or connect the input port 665 to the second output port 663 according to control of the processor 120. In addition, the antenna switch 660 may connect the input port 665 to both the first output port 661 and the second output port 663. The input port 665 may be connected to the second antenna module 680, the first output port 661 may be connected to the first band pass filter 653, and the second output port 663 may be connected to the second band pass filter 657.

For example, when the input port 665 is connected to the first output port 661, a third reception signal received through the second antenna module 680 may be transferred to the first band pass filter 653. When the input port 665 is connected to the second output port 663, a fourth reception signal received through the second antenna module 680 may be transferred to the second band pass filter 655. The third reception signal may be a reception signal corresponding to a fifth frequency band and the fourth reception signal may be a reception signal corresponding to a sixth frequency band. The fifth frequency band and the sixth frequency band may coincide with the third frequency band and the fourth frequency band. The fifth frequency band and the sixth frequency band may not overlap each other or have partial frequency bands overlapping each other.

The first band pass filter 653 may allow a third reception signal corresponding a fifth frequency band to pass therethrough. The third reception signal having passed through the first band pass filter 653 may be input to the first low noise amplifier 651. The first low noise amplifier 651 may amplify the third reception signal (Rx2) to be output to the RFIC 620.

The second band pass filter 657 may allow a fourth reception signal corresponding a sixth frequency band to pass therethrough. The fourth reception signal having passed through the second band pass filter 657 may be input to the second low noise amplifier 655. The second low noise amplifier 655 may amplify the fourth reception signal (Rx3) to be output to the RFIC 620.

Figure 7:
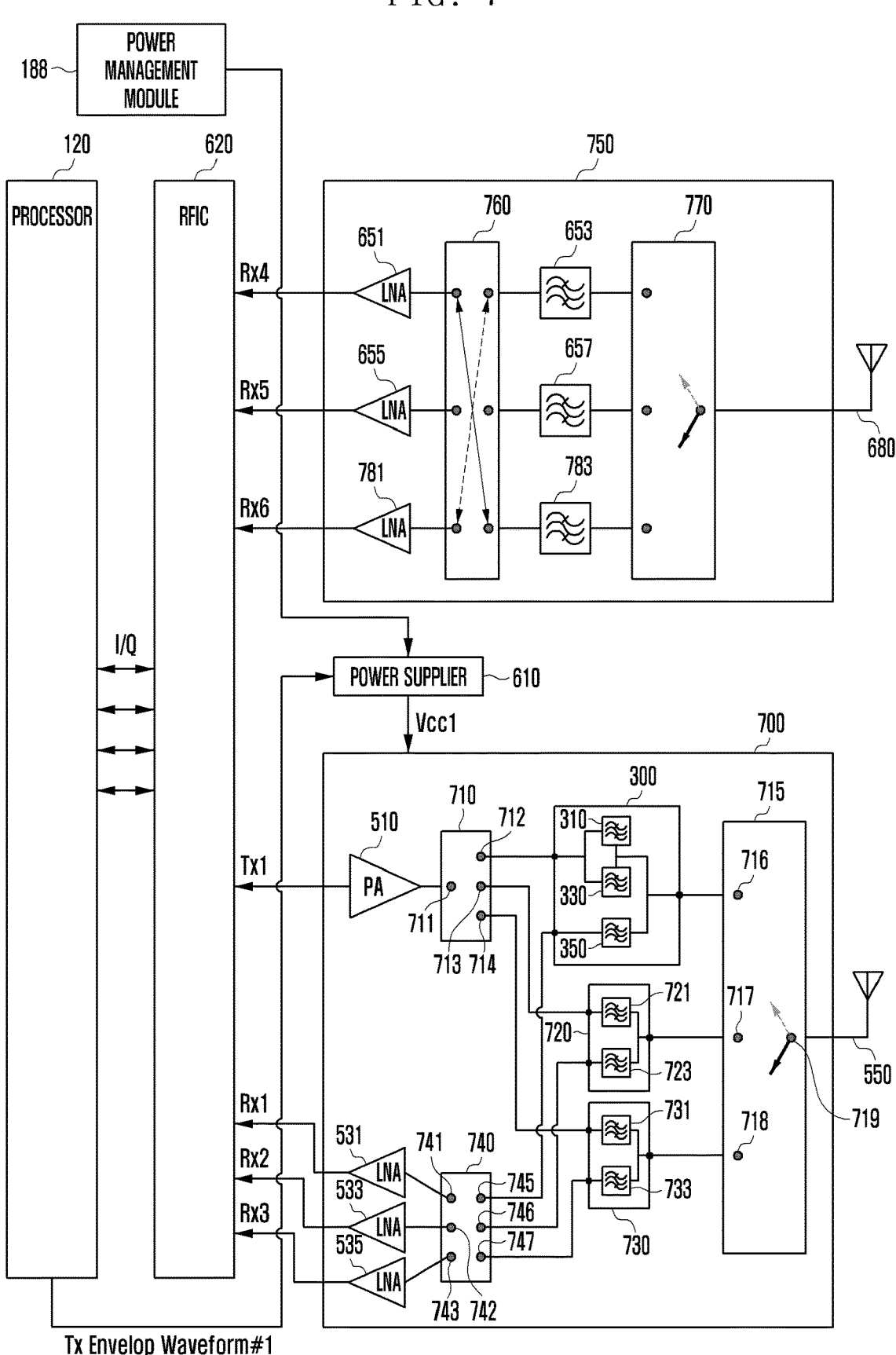
FIG. 7 illustrates communication of an example electronic device according to various embodiments.

FIG. 7 illustrates an example electronic device according to various embodiments.

Referring to FIG. 7, an electronic device (e.g., the electronic device 101 in FIG. 1) according to various embodiments may include at least one of a power management module (e.g., the power management module 188 in FIG. 1), a power supplier 610, a processor (e.g., the processor 120 in FIG. 1, and the first communication processor 212 in FIG. 2), an RFIC 620 (e.g., the first RFIC 222 in FIG. 2), a first communication circuit 700 (e.g., the communication circuit 500 in FIG. 5), a second communication circuit 750, a first antenna module 550 (e.g., the antenna module 550 in FIG.

5), or a second antenna module 680 (e.g., the antenna module 197 in FIG. 1). The first communication circuit 700 and the second communication circuit 750 may be formed (or implemented) in one integrated circuit or chip (e.g., a single chip).

The power management module 188 may manage power supplied to the electronic device 101. The power management module 188 may supply power to the power supplier 610. In an embodiment, the power supplier 610 may receive power from the power management module 188 and receive an envelope signal (Tx envelope waveform #1) from the processor 120 or the RFIC 620. The power supplier 610 may supply power (Vcc1) corresponding to the envelope signal (Tx envelope waveform #1) to the first communication circuit 700 using the supplied power. The power supplier 610 may be a component configured to supply a voltage applied to a power amplifier (e.g., the power amplifier 510 in FIG. 5). The power corresponding to the envelope signal may be supplied to the power amplifier 510 included in the first communication circuit 700.

According to an embodiment, the processor 120 may generate a baseband signal to be transferred to the RFIC 620, and the baseband signal may be converted into a radio frequency signal through the RFIC 620 to be input to the power amplifier 510. During an envelope tracking (ET) operation, based on an envelope of a radio frequency signal input from the RFIC 620 to the power amplifier 510, the processor 120 may transfer an envelope signal to the power supplier 610, and the power supplier 610 may supply power (or a voltage) to the power amplifier 510 based on the envelope signal.

Although the drawing illustrates that the processor 120 provides an envelope signal to the power supplier 610, the envelope signal may be provided from the RFIC 620 to the power supplier 610. The envelope signal may be provided from one of the processor 120 or the RFIC 620. The drawing is for helping understanding of the disclosure, and does not limit the disclosure. In addition, although the processor 120 is illustrated in the drawing, the processor 120 may refer, for example, to a communication processor (e.g., the first communication processor 212 in FIG. 2) included in a communication module (e.g., the communication module 190 in FIG. 1).

During transmission, the RFIC 620 may convert a baseband signal generated by the processor 120 into a radio frequency signal (e.g., a transmission signal) corresponding to a designated frequency band. The converted radio frequency signal (e.g., a Tx signal) may be a signal to be transferred through the first antenna module 550 and may be input to the first communication circuit 700. For example, during transmission, the RFIC 620 may transfer the converted radio frequency signal (e.g., a Tx signal) to the first communication circuit 700. During reception, the RFIC 620 may obtain a radio frequency signal (e.g., a reception signal) received from the first antenna module 550 through the first communication circuit 700, and may convert the obtained radio frequency signal into a baseband signal. In addition, during reception, the RFIC 620 may obtain a radio frequency signal (e.g., a reception signal) received from the second antenna module 680 through the second communication circuit 750, and may convert the obtained radio frequency signal into a baseband signal. During reception, the RFIC 620 may transfer the converted baseband signal to the processor 120.

The first communication circuit 700 may include at least one of a power amplifier (e.g., the power amplifier 510 in FIG. 5), a first switch 710, a multiplexer (e.g., the multiplexer 300 in FIG. 3), a first antenna switch 715, a fourth low noise amplifier 531 (e.g., the low noise amplifier 530 in FIG. 5), a fifth low noise amplifier 533, a sixth low noise amplifier 535, a second switch 740, a first duplexer 720, or a second duplexer 730. The first communication circuit 700 may include a transmission circuit (e.g., a Tx module) and a reception circuit (e.g., a Rx module). The transmission circuit may amplify a transmission signal received from the RFIC 620 to be transferred to the first antenna module 550. The reception circuit may amplify a reception signal received from the first antenna module 550 to be transferred to the RFIC 620.

The power amplifier 510 may amplify a radio frequency signal to be transferred through the first antenna module 550. The radio frequency signal may be input from the RFIC 620. The radio frequency signal is a signal to be transmitted through the first antenna module 550 and thus may be referred to, for example, as a transmission signal (Tx). A transmission signal (Tx) having been amplified through the power amplifier 510 may be input to at least one of the multiplexer 300, the first duplexer 720, or the second duplexer 730.

The first switch 710 may perform switching such that a transmission signal output from the power amplifier 510 is input to at least one of the multiplexer 300, the first duplexer 720, or the second duplexer 730. The first switch 710 may be switched according to control of the processor 120. For example, the first switch 710 may include a first input port 711, a first output port 712, a second output port 713, and a third output port 714. The first input port 711 may be connected to the power amplifier 510. The first output port 712 may be connected to the multiplexer 300, the second output port 713 may be connected to the first duplexer 720, and the third output port 714 may be connected to the second duplexer 730.

The multiplexer 300 may transfer a transmission signal input from the power amplifier 510 to the first antenna module 550, or transfer a reception signal obtained from the first antenna module 550 to a low noise amplifier (e.g., the fourth low noise amplifier 531, the fifth low noise amplifier 533, and the sixth low noise amplifier 535). The multiplexer 300 may include at least one of a first filter (e.g., the first filter 310 in FIG. 3), a second filter (e.g., the second filter 330 in FIG. 3), or a third filter (e.g., the third filter 350 in FIG. 3). The multiplexer 300 has been described in detail with reference to FIG. 3 and FIG. 5 and thus will be briefly described below.

The first filter 310 may be a band pass filter configured to allow a first transmission signal corresponding to a first frequency band to pass therethrough. The second filter 330 may be a band pass filter configured to allow a second transmission signal corresponding to a second frequency band to pass therethrough. The second frequency band is different from the first frequency band, and the first frequency band and the second frequency band may not overlap each other. The third filter 350 may be a band pass filter configured to allow a first reception signal corresponding to a third frequency band or a second reception signal corresponding to a fourth frequency band to pass therethrough.

The first duplexer 720 may transfer a transmission signal input from the power amplifier 510 to the first antenna module 550, or transfer a reception signal obtained from the first antenna module 550 to a low noise amplifier (e.g., the fourth low noise amplifier 531, the fifth low noise amplifier 533, and the sixth low noise amplifier 535). The first duplexer 720 may include a fourth band pass filter 721 or a fifth band pass filter 723. The fourth band pass filter 721 may be a band pass filter configured to allow a third transmission signal corresponding a fifth frequency band to pass therethrough. The fifth band pass filter 723 may be a band pass filter configured to allow a third reception signal corresponding a sixth frequency band to pass therethrough.

The second duplexer 730 may transfer a transmission signal input from the power amplifier 510 to the first antenna module 550, or transfer a reception signal obtained from the first antenna module 550 to a low noise amplifier (e.g., the fourth low noise amplifier 531, the fifth low noise amplifier 533, and the sixth low noise amplifier 535). The second duplexer 730 may include a sixth band pass filter 731 or a seventh band pass filter 733. The sixth band pass filter 731 may be a band pass filter configured to allow a fourth transmission signal corresponding a seventh frequency band to pass therethrough. The seventh band pass filter 723 may be a band pass filter configured to allow a fourth reception signal corresponding an eighth frequency band to pass therethrough.

When the first input port 711 of the first switch 710 is connected to the first output port 712, a transmission signal (e.g., a first transmission signal or a second transmission signal) transferred through the first output port 712 may be input to the first filter 310 or the second filter 330 through a first port (e.g., the first port 301 in FIG. 3) of the multiplexer 300. When the first input port 711 of the first switch 710 is connected to the second output port 713, a third transmission signal transferred through the second output port 713 may be input to the fourth band pass filter 721 of the first duplexer 720. When the first input port 711 of the first switch 710 is connected to the third output port 714, a fourth transmission signal transferred through the third output port 714 may be input to the sixth band pass filter 731 of the second duplexer 730.

In an ENDC situation in which the first transmission signal and the second transmission signal are simultaneously output from the power amplifier 510, the multiplexer 300 may simultaneously receive the first transmission signal and the second transmission signal from the power amplifier 510. The first transmission signal may be transferred to the first antenna module 550 through the first filter 310, and the second transmission signal may be transferred to the first antenna module 550 through the second filter 330. The first transmission signal and the second transmission signal may frequency bands not overlapping each other, and may be transferred to the first antenna module 550 through the first filter 310 and the second filter 330, respectively.

The first antenna switch 715 may include at least one of a first port 716, a second port 717, a third port 718, or a fourth port 719. The first antenna switch 715 may connect the fourth port 719 to at least one of the first port 716, the second port 717, or the third port 718 according to control of the processor 120. The first port 716 may be connected to the multiplexer 300, the second port 717 may be connected to the first duplexer 720, the third port 718 may be connected to the second duplexer 730, and the fourth port 719 may be connected to the first antenna module 550.

For example, when the fourth port 719 of the first antenna switch 715 is connected to the first port 716, a first transmission signal or a second transmission signal may be transferred to the first antenna module 550. Alternatively, when the fourth port 719 of the first antenna switch 715 is connected to the first port 716, a first reception signal or a second reception signal received from the first antenna module 550 may be transferred to the multiplexer 300. When the fourth port 719 is connected to the second port 717, a third transmission signal may be transferred to the first antenna module 550, or a third reception signal received from the first antenna module 550 may be transferred to the first duplexer 720. When the fourth port 719 is connected to the third port 718, a fourth transmission signal may be transferred to the first antenna module 550, or a fourth reception signal received from the first antenna module 550 may be transferred to the second duplexer 730.

The second switch 740 may perform switching such that a reception signal output from at least one of the multiplexer 300, the first duplexer 720, or the second duplexer 730 is input to at least one of the fourth low noise amplifier 531, the fifth low noise amplifier 533, or the sixth low noise amplifier 535. The second switch 740 may be switched according to control of the processor 120. For example, the second switch 740 may include at least one of a first port 741, a second port 742, a third port 743, a fourth port 745, a fifth port 746, or a sixth port 747. The first port 741 may be connected to the fourth low noise amplifier 531, the second port 742 may be connected to the fifth low noise amplifier 533, and the third port 743 may be connected to the sixth low noise amplifier 535. At least one of the fourth low noise amplifier 531, the fifth low noise amplifier 533, or the sixth low noise amplifier 535 may amplify the transmission signal to be output to the RFIC 620.

The second communication circuit 750 may include at least one of a first low noise amplifier 651, a first band pass filter 653, a second low noise amplifier 655, a second band pass filter 657, a third low noise amplifier 781, a third band pass filter 783, a third switch 760, or a second antenna switch 770. The second communication circuit 750 may correspond to a reception circuit (e.g., a Rx module). The second communication circuit 750 may amplify a reception signal received through the second antenna module 680 to be transferred to the RFIC 620.

The third switch 760 may perform switching such that a reception signal output from at least one of the first band pass filter 653, the second band pass filter 657, and the third band pass filter 783 is input to at least one of the first low noise amplifier 651, the second low noise amplifier 655, or the third low noise amplifier 781. The third switch 760 may be switched according to control of the processor 120.

The second antenna switch 770 may perform switching according to control of the processor 120 such that a reception signal received through the second antenna module 680 is input to at least one of the first band pass filter 653, the second band pass filter 657, and the third band pass filter 783. For example, a reception signal received through the second antenna module 680 may be transferred to the first band pass filter 653. A reception signal received through the second antenna module 680 may be transferred to the second band pass filter 655. Alternatively, a reception signal received through the second antenna module 680 may be transferred to the third band pass filter 783.

A reception signal having passed through the first band pass filter 653, the second band pass filter 657, or the third band pass filter 783 may be input to at least one of the first low noise amplifier 651, the second low noise amplifier 655, or the third low noise amplifier 783 according to the third switch 760. At least one of the first low noise amplifier 651, the second low noise amplifier 655, or the third low noise amplifier 783 may amplify an input reception signal to be output to the RFIC 620.

Figure 8:
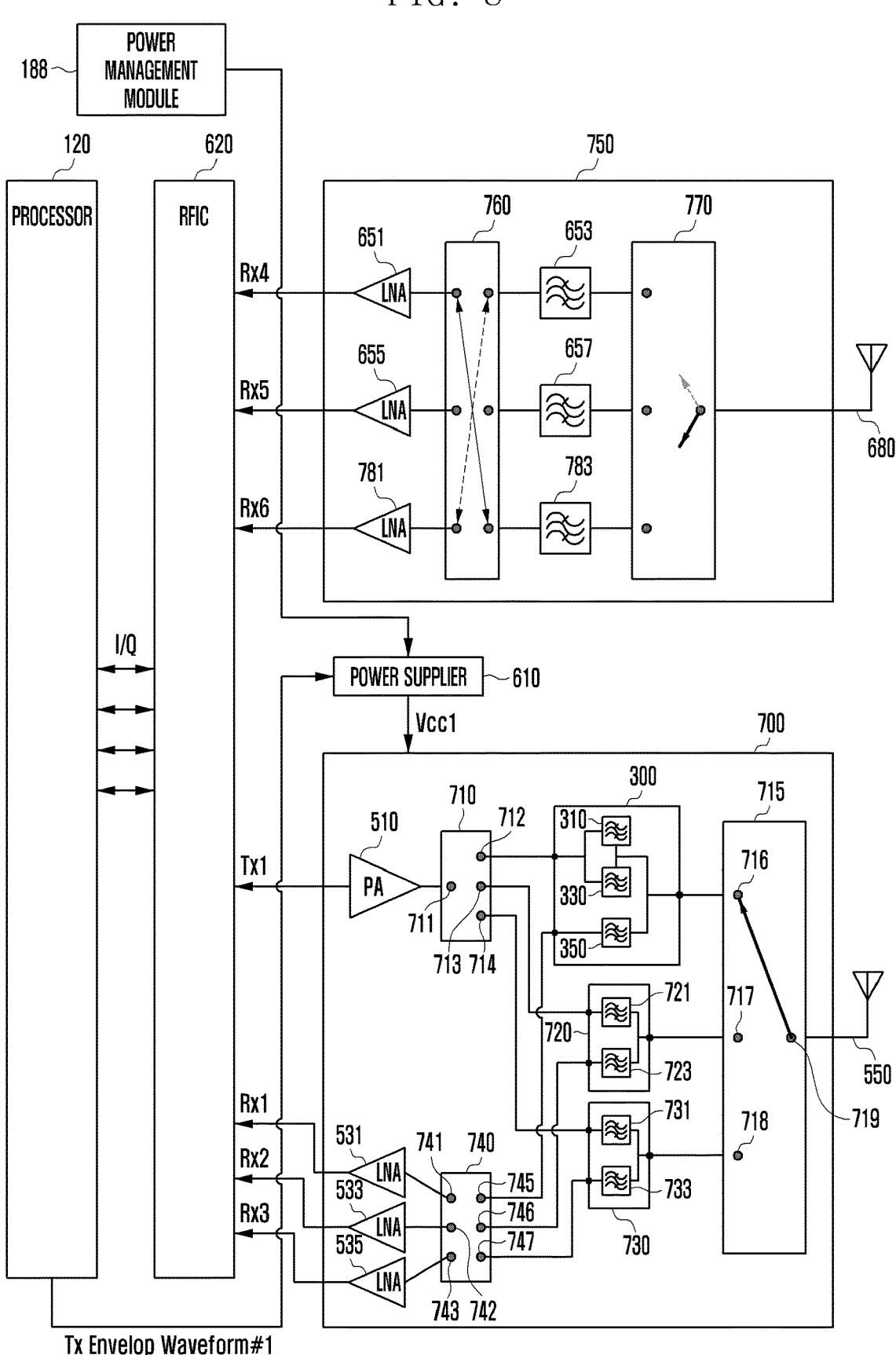
FIG. 8 illustrates communication in a first situation in an example electronic device according to various embodiments.

FIG. 8 illustrates a first situation in an example electronic device according to various embodiments.

Referring to FIG. 8, an electronic device (e.g., the electronic device 101 in FIG. 1) may include at least one of a power management module (e.g., the power management module 188 in FIG. 1), a power supplier 610, a processor (e.g., the processor 120 in FIG. 1, and the first communication processor 212 in FIG. 2), an RFIC 620 (e.g., the first RFIC 222 in FIG. 2), a first communication circuit 700 (e.g., the communication circuit 500 in FIG. 5), a second communication circuit 750, a first antenna module 550 (e.g., the antenna module 550 in FIG. 5), or a second antenna module 680 (e.g., the antenna module 197 in FIG. 1). The first communication circuit 700 and the second communication circuit 750 may be formed (or implemented) in one integrated circuit or chip (e.g., a single chip).

FIG. 8 may illustrate the same circuit configuration as that of FIG. 7, and illustrate an example of switching the first antenna switch 715. Therefore, a description overlapping with FIG. 7 may be briefly described.

The power management module 188 may manage power supplied to the electronic device 101. The power management module 188 may supply power to the power supplier 610. In an embodiment, the power supplier 610 may receive power from the power management module 188 and receive an envelope signal (Tx envelop waveform #1) from the processor 120 or the RFIC 620. The power supplier 610 may supply power (Vcc1) corresponding to the envelope signal (Tx envelop waveform #1) to the first communication circuit 670 using the supplied power.

According to an embodiment, the processor 120 may generate a baseband signal to be transferred to the RFIC 620, and the baseband signal may be converted into a radio frequency signal through the RFIC 620 to be input to the power amplifier 510. During an envelope tracking (ET) operation, based on an envelope of a radio frequency signal input from the RFIC 620 to the power amplifier 510, the processor 120 may transfer an envelope signal to the power supplier 610, and the power supplier 610 may supply power (or a voltage) to the power amplifier 510 based on the envelope signal.

During transmission, the RFIC 620 may convert a baseband signal generated by the processor 120 into a radio frequency signal (e.g., a transmission signal) corresponding to a designated frequency band. The converted radio frequency signal (e.g., a Tx signal) may be a signal to be transferred through the first antenna module 550 and may be input to the first communication circuit 700. During reception, the RFIC 620 may obtain a radio frequency signal (e.g., a reception signal) received from the first antenna module 550 through the first communication circuit 700, and may convert the obtained radio frequency signal into a baseband signal. In addition, during reception, the RFIC 620 may obtain a radio frequency signal (e.g., a reception signal) received from the second antenna module 680 through the second communication circuit 650, and may convert the obtained radio frequency signal into a baseband signal. During reception, the RFIC 620 may transfer the converted baseband signal to the processor 120.

The first communication circuit 700 may include at least one of a power amplifier (e.g., the power amplifier 510 in FIG. 5), a first switch 710, a multiplexer (e.g., the multiplexer 300 in FIG. 3), a first antenna switch 715, a fourth low noise amplifier 531 (e.g., the low noise amplifier 530 in FIG. 5), a fifth low noise amplifier 533, a sixth low noise amplifier 535, a second switch 740, a first duplexer 720, or a second duplexer 730. The first communication circuit 700 may include a transmission circuit (e.g., a Tx module) and a reception circuit (e.g., a Rx module). The transmission circuit may amplify a transmission signal received from the RFIC 620 to be transferred to the first antenna module 550.

The reception circuit may amplify a reception signal received from the first antenna module 550 to be transferred to the RFIC 620.

The power amplifier 510 may amplify a radio frequency signal to be transferred through the first antenna module 550. The radio frequency signal may be input from the RFIC 620. The radio frequency signal is a signal to be transmitted through the first antenna module 550 and thus may be referred to, for example, as a transmission signal (Tx). A transmission signal (Tx) having been amplified through the power amplifier 510 may be input to at least one of the multiplexer 300, the first duplexer 720, or the second duplexer 730. The first switch 710 may perform switching according to control of the processor 120 such that a transmission signal output from the power amplifier 510 is input to at least one of the multiplexer 300, the first duplexer 720, or the second duplexer 730.

The multiplexer 300 may transfer a transmission signal input from the power amplifier 510 to the first antenna module 550, or transfer a reception signal obtained from the first antenna module 550 to a low noise amplifier (e.g., the fourth low noise amplifier 531, the fifth low noise amplifier 533, and the sixth low noise amplifier 535). The first duplexer 720 may transfer a transmission signal input from the power amplifier 510 to the first antenna module 550, or transfer a reception signal obtained from the first antenna module 550 to a low noise amplifier (e.g., the fourth low noise amplifier 531, the fifth low noise amplifier 533, and the sixth low noise amplifier 535). The second duplexer 730 may transfer a transmission signal input from the power amplifier 510 to the first antenna module 550, or transfer a reception signal obtained from the first antenna module 550 to a low noise amplifier (e.g., the fourth low noise amplifier 531, the fifth low noise amplifier 533, and the sixth low noise amplifier 535).

The first antenna switch 715 may include at least one of a first port 716, a second port 717, a third port 718, or a fourth port 719. The first antenna switch 715 may connect the fourth port 719 to at least one of the first port 716, the second port 717, or the third port 718 according to control of the processor 120. For example, when a first transmission signal is required to be transferred, the first antenna switch 715 may connect the first port 716 to the fourth port 719 so as to transfer the first transmission signal to the first antenna module 550. The first antenna module 550 may propagate (or output) the first transmission signal to the outside of the electronic device 101. Alternatively, when a second transmission signal is required to be transferred, the first antenna switch 715 may connect the first port 716 to the fourth port 719 so as to transfer the second transmission signal to the first antenna module 550. The first antenna module 550 may propagate (or output) the second transmission signal to the outside of the electronic device 101.

The second communication circuit 750 may include at least one of a first low noise amplifier 651, a first band pass filter 653, a second low noise amplifier 655, a second band pass filter 657, a third low noise amplifier 781, a third band pass filter 783, a third switch 760, or a second antenna switch 770. The second communication circuit 750 may correspond to a reception circuit (e.g., a Rx module). The second communication circuit 750 may amplify a reception signal received through the second antenna module 680 to be transferred to the RFIC 620.

Figure 9:
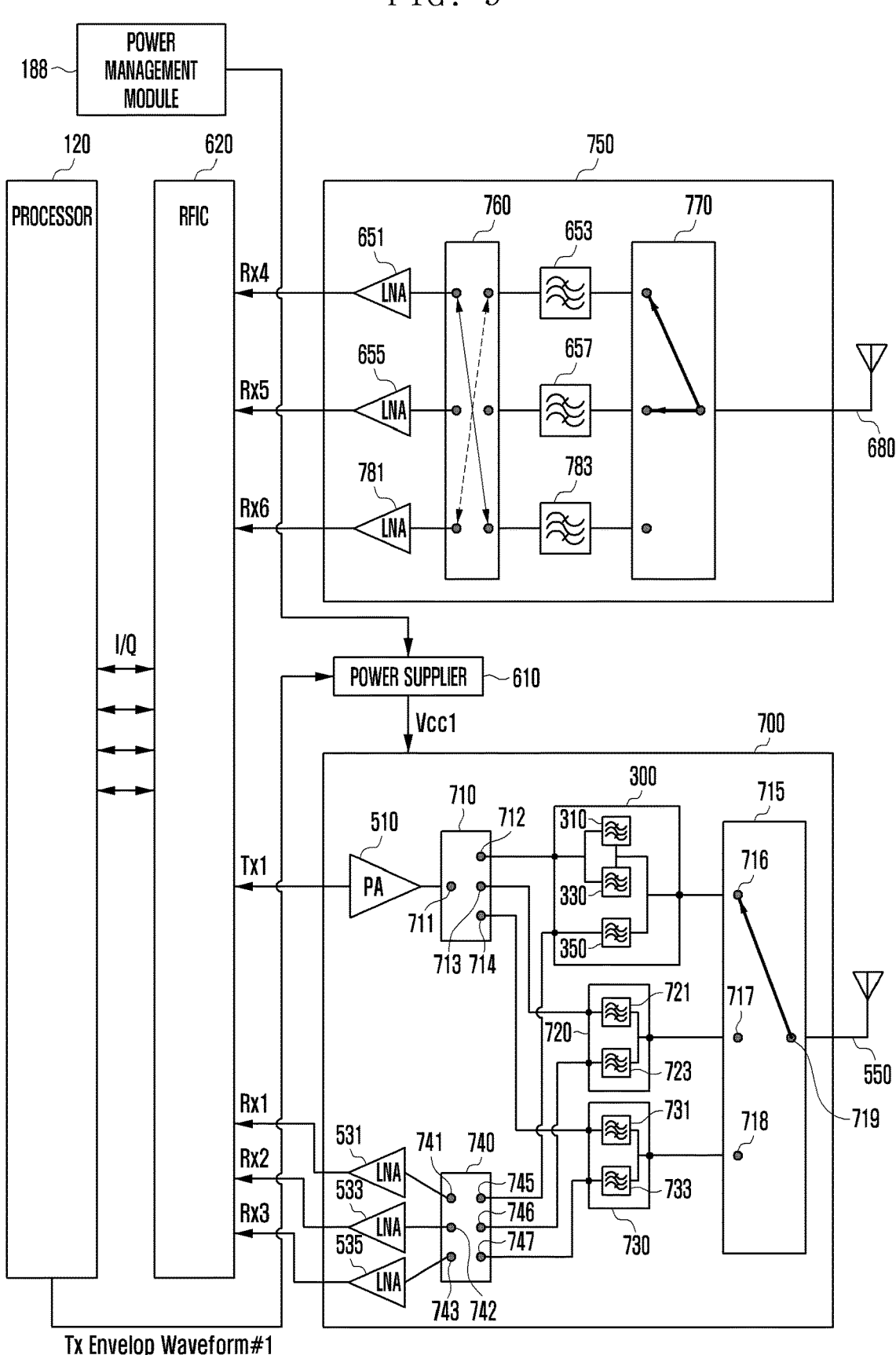
FIG. 9 illustrates communication in a second situation in an example electronic device according to various embodiments.

FIG. 9 illustrates a second situation in an example electronic device according to various embodiments.

An electronic device (e.g., the electronic device 101 in FIG. 1) according to various embodiments may include at least one of a power management module (e.g., the power management module 188 in FIG. 1), a power supplier 610, a processor (e.g., the processor 120 in FIG. 1, and the first communication processor 212 in FIG. 2), an RFIC 620 (e.g., the first RFIC 222 in FIG. 2), a first communication circuit 700 (e.g., the communication circuit 500 in FIG. 5), a second communication circuit 750, a first antenna module 550 (e.g., the antenna module 550 in FIG. 5), or a second antenna module 680 (e.g., the antenna module 197 in FIG. 1). The first communication circuit 700 and the second communication circuit 750 may be formed (or implemented) in one integrated circuit or chip (e.g., a single chip).

FIG. 9 may illustrate the same circuit configuration as that of FIG. 7, and illustrate an example of switching the first antenna switch 715. Therefore, a description overlapping with FIG. 7 may be briefly described.

The power management module 188 may manage power supplied to the electronic device 101. The power management module 188 may supply power to the power supplier 610. In an embodiment, the power supplier 610 may receive power from the power management module 188 and receive an envelope signal (Tx envelop waveform #1) from the processor 120 or RFIC 620. The power supplier 610 may supply power (Vcc1) corresponding to the envelope signal (Tx envelop waveform #1) to the first communication circuit 670 using the supplied power.

According to an embodiment, the processor 120 may generate a baseband signal to be transferred to the RFIC 620, and the baseband signal may be converted into a radio frequency signal through the RFIC 620 to be input to the power amplifier 510. During an envelope tracking (ET) operation, based on an envelope of a radio frequency signal input from the RFIC 620 to the power amplifier 510, the processor 120 may transfer an envelope signal to the power supplier 610, and the power supplier 610 may supply power (or a voltage) to the power amplifier 510 based on the envelope signal.

During transmission, the RFIC 620 may convert a baseband signal generated by the processor 120 into a radio frequency signal (e.g., a transmission signal) corresponding to a designated frequency band. The converted radio frequency signal (e.g., a Tx signal) may be a signal to be transferred through the first antenna module 550 and may be input to the first communication circuit 700. During reception, the RFIC 620 may obtain a radio frequency signal (e.g., a reception signal) received from the first antenna module 550 through the first communication circuit 700, and may convert the obtained radio frequency signal into a baseband signal. In addition, during reception, the RFIC 620 may obtain a radio frequency signal (e.g., a reception signal) received from the second antenna module 680 through the second communication circuit 650, and may convert the obtained radio frequency signal into a baseband signal. During reception, the RFIC 620 may transfer the converted baseband signal to the processor 120.

The first communication circuit 700 may include at least one of a power amplifier (e.g., the power amplifier 510 in FIG. 5), a first switch 710, a multiplexer (e.g., the multiplexer 300 in FIG. 3), a first antenna switch 715, a fourth low noise amplifier 531 (e.g., the low noise amplifier 530 in FIG. 5), a fifth low noise amplifier 533, a sixth low noise amplifier 535, a second switch 740, a first duplexer 720, or a second duplexer 730. The first communication circuit 700 may include a transmission circuit (e.g., a Tx module) and a reception circuit (e.g., a Rx module). The transmission circuit may amplify a transmission signal received from the RFIC 620 to be transferred to the first antenna module 550.

The reception circuit may amplify a reception signal received from the first antenna module 550 to be transferred to the RFIC 620.

The power amplifier 510 may amplify a radio frequency signal to be transferred through the first antenna module 550. The radio frequency signal may be input from the RFIC 620. The radio frequency signal is a signal to be transmitted through the first antenna module 550 and thus may be referred to, for example, as a transmission signal (Tx). A transmission signal (Tx) having been amplified through the power amplifier 510 may be input to at least one of the multiplexer 300, the first duplexer 720, or the second duplexer 730. The first switch 710 may perform switching according to control of the processor 120 such that a transmission signal output from the power amplifier 510 is input to at least one of the multiplexer 300, the first duplexer 720, or the second duplexer 730.

The multiplexer 300 may transfer a transmission signal input from the power amplifier 510 to the first antenna module 550, or transfer a reception signal obtained from the first antenna module 550 to a low noise amplifier (e.g., the fourth low noise amplifier 531, the fifth low noise amplifier 533, and the sixth low noise amplifier 535). The first duplexer 720 may transfer a transmission signal input from the power amplifier 510 to the first antenna module 550, or transfer a reception signal obtained from the first antenna module 550 to a low noise amplifier (e.g., the fourth low noise amplifier 531, the fifth low noise amplifier 533, and the sixth low noise amplifier 535). The second duplexer 730 may transfer a transmission signal input from the power amplifier 510 to the first antenna module 550, or transfer a reception signal obtained from the first antenna module 550 to a low noise amplifier (e.g., the fourth low noise amplifier 531, the fifth low noise amplifier 533, and the sixth low noise amplifier 535).

The first antenna switch 715 may include at least one of a first port 716, a second port 717, a third port 718, or a fourth port 719. The first antenna switch 715 may connect the fourth port 719 to at least one of the first port 716, the second port 717, or the third port 718 according to control of the processor 120. For example, when a first transmission signal and a second transmission signal are required to be simultaneously transferred (e.g., ENDC), the first antenna switch 715 may connect the first port 716 to the fourth port 719 so as to transfer the first transmission signal and the second transmission signal to the first antenna module 550. The first antenna module 550 may propagate (or output) the first transmission signal and the second transmission signal to the outside of the electronic device 101.

In addition, the first antenna switch 715 may connect the first port 716 to the fourth port 719 so as to transfer a first reception signal and a second reception signal received from the first antenna module 550 to the multiplexer 300. The multiplexer 300 may transfer the first reception signal and the second reception signal to a low noise amplifier (e.g., one of the fourth low noise amplifier 531, the fifth low noise amplifier 533, and the sixth low noise amplifier 535). At least one of the fourth low noise amplifier 531, the fifth low noise amplifier 533, or the sixth low noise amplifier 535 may amplify the first reception signal and the second reception signal to be output to the RFIC 620.

The second communication circuit 750 may include at least one of a first low noise amplifier 651, a first band pass filter 653, a second low noise amplifier 655, a second band pass filter 657, a third low noise amplifier 781, a third band pass filter 783, a third switch 760, or a second antenna switch 770. The second communication circuit 750 may correspond to a reception circuit (e.g., a Rx module). The second communication circuit 750 may amplify a reception signal received through the second antenna module 680 to be transferred to the RFIC 620.

The second antenna switch 770 may perform switching according to control of the processor 120 such that a reception signal received through the second antenna module 680 is input to at least one of the first band pass filter 653, the second band pass filter 657, and the third band pass filter 783. For example, in an ENDC situation, the second antenna switch 770 may transfer a third reception signal received through the second antenna module 680 to the first band pass filter 653 and transfer a fourth reception signal to the second band pass filter 657. A third reception signal having passed through the first band pass filter 653 may be transferred to a low noise amplifier (e.g., one of the first low noise amplifier 651, the second low noise amplifier 655, and the third low noise amplifier 781). A fourth reception signal having passed through the second band pass filter 655 may be transferred to a low noise amplifier (e.g., one of the first low noise amplifier 651, the second low noise amplifier 655, and the third low noise amplifier 781). At least one of the first low noise amplifier 651 to the third low noise amplifier 781 may amplify the third reception signal and the fourth reception signal to be output to the RFIC 620.

An electronic device (e.g., the electronic device 101 in FIG. 1) according to various embodiments may include an antenna (e.g., the antenna module 197 in FIG. 1), a communication circuit (e.g., the communication circuit 500 in FIG. 5), and a processor (e.g., the processor 120 in FIG. 1) operatively connected to the antenna or the communication circuit, wherein the communication circuit includes a multiplexer (e.g., the multiplexer 300 in FIG. 3) including a first filter (e.g., the first filter 310 in FIG. 3) connected to a power amplifier (e.g., the power amplifier 510 in FIG. 5) and allowing a first transmission signal corresponding to a first frequency band and output from the power amplifier to pass therethrough so as to be output to the antenna, a second filter (e.g., the second filter 330 in FIG. 3) connected to the power amplifier and allowing a second transmission signal corresponding to a second frequency band and output from the power amplifier to pass therethrough so as to be output to the antenna, and a third filter (e.g., the third filter 350 in FIG. 3) allowing a reception signal obtained through the antenna to pass therethrough.

The communication circuit may include: a power amplifier configured to amplify the first transmission signal or the second transmission signal to be transferred through the antenna; and a low noise amplifier (e.g., the low noise amplifier 530 in FIG. 5) configured to amplify a reception signal received from the antenna.

The electronic device may further include an RFIC (e.g., the first RFIC 222 in FIG. 2) configured to convert a reception signal amplified by the low noise amplifier and transfer an amplified reception signal to the processor.

The third filter may be configured to allow a first reception signal corresponding to a third frequency band or a second reception signal corresponding to a fourth frequency band, which are obtained through the antenna, to pass therethrough so as to be output to the low noise amplifier.

The communication circuit may further include a duplexer (e.g., the first duplexer 720 in FIG. 7) configured to output a third transmission signal corresponding to a fifth frequency band to the antenna or allow a third reception signal received from the antenna and corresponding to a sixth frequency band to pass therethrough so as to be output to the low noise amplifier, and an antenna switch (e.g., the antenna switch 715 in FIG. 7) configured to be connected to the multiplexer or the duplexer.

The processor may be configured to control the antenna switch such that the first transmission signal or the second transmission signal output from the multiplexer is transferred to the antenna, or the third transmission signal output from the duplexer is transferred to the antenna.

The electronic device may further include a power supplier configured to receive power from a power management module of the electronic device and supply power to the power amplifier according to control of the processor.

The embodiments disclosed in the specification and the drawings are merely presented as specific examples to easily explain the technical features and help understanding of the disclosure and are not intended to limit the scope of the disclosure. Therefore, the scope of the disclosure should be construed as encompassing all changes or modifications derived from the technical ideas of the disclosure in addition to the embodiments disclosed herein.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A multiplexer comprising:

a first port connected to a first amplifier, wherein the first amplifier configured to amplify radio frequency signals to be transmitted to an antenna;

a second port connected to the antenna;

a third port connected to a second amplifier, wherein the second amplifier configured to amplify radio frequency signals to be received from the antenna;

a first filter configured to allow first transmission signals corresponding to a first frequency band and obtained through the first port to pass therethrough for output to the second port;

a second filter configured to allow second transmission signals obtained through the first port and corresponding to a second frequency band different from the first frequency band to pass therethrough for output to the second port; and a third filter configured to allow first reception signals corresponding to a third frequency band or a second reception signals corresponding to a fourth frequency band, which are obtained through the second port, to pass therethrough for output to the third port, wherein, when the first transmission signals and the second transmission signals are simultaneously obtained by the first filter and the second filter through the first port, the first filter is configured to allow the first transmission signals to pass therethrough for output to the second port and the second filter is configured to allow the second transmission signals to pass therethrough for output to the second port.

2. The multiplexer of claim 1, wherein the first filter, the second filter, and the third filter comprise band pass filters.

3. The multiplexer of claim 1, wherein the second port is configured to transfer the first transmission signals or the second transmission signals to the antenna, or transfer the second reception signals or the first reception signals, which are received from the antenna, to the third filter.

4. The multiplexer of claim 1, wherein the first frequency band and the second frequency band are non-overlapping.

5. The multiplexer of claim 1, wherein the third frequency band and the fourth frequency band are at least partially overlapping.

6. A communication circuit comprising a transmission circuit configured to amplify radio frequency signals to be transmitted through an antenna of an electronic device and a reception circuit configured to amplify radio frequency signals received from the antenna, the communication circuit comprising:

a first amplifier configured to amplify radio frequency signals to be transmitted to the antenna;

a multiplexer connected to the first amplifier to output radio frequency signals output from the first amplifier to the antenna, and connected to the antenna to output radio frequency signals received from the antenna to a second amplifier; and the second amplifier connected to the multiplexer to amplify radio frequency signals output from the multiplexer, wherein the multiplexer comprises:

a first filter configured to allow first transmission signals corresponding to a first frequency band to pass therethrough for output to the antenna, a second filter configured to allow second transmission signals corresponding to a second frequency band different from the first frequency band to pass therethrough for output to the antenna, and a third filter configured to allow first reception signals corresponding to a third frequency band or second reception signals corresponding to a fourth frequency band, which are received from the antenna, to pass therethrough for output to the second amplifier, wherein, when the first transmission signals and the second transmission signals are simultaneously obtained from the first amplifier, the first filter is configured to allow the first transmission signals to pass therethrough for output to the antenna and the second filter is configured to allow the second transmission signals to pass therethrough for output to the antenna.

7. The communication circuit of claim 6, wherein the first filter, the second filter, and the third filter comprise band pass filters.

8. The communication circuit of claim 6, wherein the first frequency band and the second frequency band are non-overlapping.

9. The communication circuit of claim 6, wherein the third frequency band and the fourth frequency band are at least partially overlapping.

10. An electronic device comprising:
an antenna;
a communication circuit; and
a processor, comprising processing circuitry, operatively connected to the antenna or the communication circuit, wherein the communication circuit comprises:
  a multiplexer comprising a first filter connected to a first amplifier and configured to allow first transmission signals output from the first amplifier and corresponding to a first frequency band to pass therethrough for output to the antenna, a second filter connected to the first amplifier and configured to allow a second transmission signals output from the first amplifier and corresponding to a second frequency band to pass therethrough for output to the antenna, and a third filter configured to allow reception signals received through the antenna to pass therethrough, wherein, when the first transmission signals and the second transmission signals are simultaneously obtained from the first amplifier, the first filter is configured to allow the first transmission signals to pass therethrough for output to the antenna and the second filter is configured to allow the second transmission signals to pass therethrough for output to the antenna.

11. The electronic device of claim 10, wherein the first filter, the second filter, and the third filter comprise band pass filters.

12. The electronic device of claim 10, wherein the first frequency band and the second frequency band are non-overlapping.

13. The electronic device of claim 10, wherein the communication circuit comprises:
  a second amplifier configured to amplify reception signals received from the antenna.

14. The electronic device of claim 13, further comprising:
a radio frequency integrated circuit (RFIC) configured to convert a reception signals amplified by the second amplifier and transfer amplified reception signals to the processor.

15. The electronic device of claim 13, wherein the third filter is configured to allow first reception signals corresponding to a third frequency band or a second reception signals corresponding to a fourth frequency band, which are received from the antenna, to pass therethrough so as to be output to the second amplifier.

16. The electronic device of claim 13, wherein the communication circuit comprises:
  a duplexer configured to output a third transmission signals corresponding to a fifth frequency band to the antenna, or configured to allow third reception signals received from the antenna and corresponding to a sixth frequency band to pass therethrough so as to be output to the second amplifier; and
  an antenna switch configured to connect the multiplexer or the duplexer to the antenna.

17. The electronic device of claim 16, wherein the processor is configured to control the antenna switch such that the second transmission signals or the first transmission signals output from the multiplexer is transferred to the antenna, or the third transmission signals output from the duplexer is transferred to the antenna.

18. The electronic device of claim 10, further comprising:
a power supplier configured to receive power from a power management circuit of the electronic device and supply power to the first amplifier according to control of the processor.

* * * * *